United States Patent

[11] 3,568,750

[72] Inventor: Hermann Henning, Hannover, Germany
[21] Appl. No.: 736,336
[22] Filed: June 12, 1968
[45] Patented: Mar. 9, 1971
[73] Assignee: Continental Gummi-Werke Aktiengesellschaft, Hannover, Germany
[32] Priority: June 13, 1967
[33] Germany
[31] P 16 05 633.1

[54] PNEUMATIC VEHICLE TIRE
8 Claims, 3 Drawing Figs.

[52] U.S. Cl. .................................................. 152/354
[51] Int. Cl. .................................................. B60c 9/06
[50] Field of Search .................................. 152/354, 355, 356, 361

[56] References Cited
UNITED STATES PATENTS
3,481,386  12/1969  Menell et al. ................. 152/354
FOREIGN PATENTS
1,474,669  2/1967  France .......................... 152/354

Primary Examiner—Arthur L. LaPoint
Attorney—Walter Becker

ABSTRACT: Strength members cross each other in two superimposed layers in tire sidewalls. Near tire beads adjacent to inner hollow chamber means, strength member portions extend at least nearly at right angles to tire circumferential direction; in tire sidewalls adjacent tire shoulders, these strength member portions extend at an inclined relative to tire circumferential direction. Strength member portions extend at an incline in the layer adjacent tire outer surface and in tire sidewalls adjacent to tire beads, latter strength members extend at least nearly at right angles to tire circumferential direction in sidewall area.

PATENTED MAR 9 1971  3,568,750

PNEUMATIC VEHICLE TIRE

The present invention relates to a pneumatic vehicle tire with strength members in the form of threads, wires, or cords or the like located in two superimposed layers in the sidewalls while said strength members in each layer are parallel to each other but are so arranged that the strength members of one layer cross the strength members of the other layer, the arrangement being such that some strength members extend at a substantially right angle with regard to the circumferential direction of the tire while other strength members extend at an angle to the circumferential direction of the tire.

With heretofore known pneumatic tires with the above-mentioned strength members in the tire sidewalls, the strength members in one layer extend at a right angle to the circumferential direction of the tire while maintaining said direction from the tire beads to the zenith portion of the tire. The strength members inclined thereto likewise extend over said areas but are inclined so that while forming a full fabric or while employing two layers of strength members, they form cross-connection. Thus, the strength members in the tire sidewalls are arranged at all levels so that they extend in three different directions.

The present invention is based on the finding that with a nondeformed tire in operation, the superimposed strength members in the tire sidewall are subjected exclusively to tension stresses. When the tire at the ground contacting area is pressed inwardly, the tension stresses will change due to the lateral bulging of the tire sidewalls. It has furthermore been found, according to the invention, that strength members which extend at a right angle to the tire circumferential direction are best suited for absorbing pulling stresses, whereas strength members extending at an angle or are inclined to the circumferential direction of the tire, are better suited for absorbing pressure forces if these pressure forces are directed not in the longitudinal direction of said strength members but, as is the case with the above-mentioned strength members, are directed at a right angle with regard to the circumferential direction of the tire.

It is an object of the present invention so to improve tires of the above-mentioned type that the strength members in the tire sidewalls will, when subjected to an inward spring by contact with the ground surface and to the dynamic load inherent thereto, be subjected to almost favorable stress.

These and other objects and advantages of the invention will appear more clearly from the following specification in connection with the accompanying drawing, in which.

Figure 1:
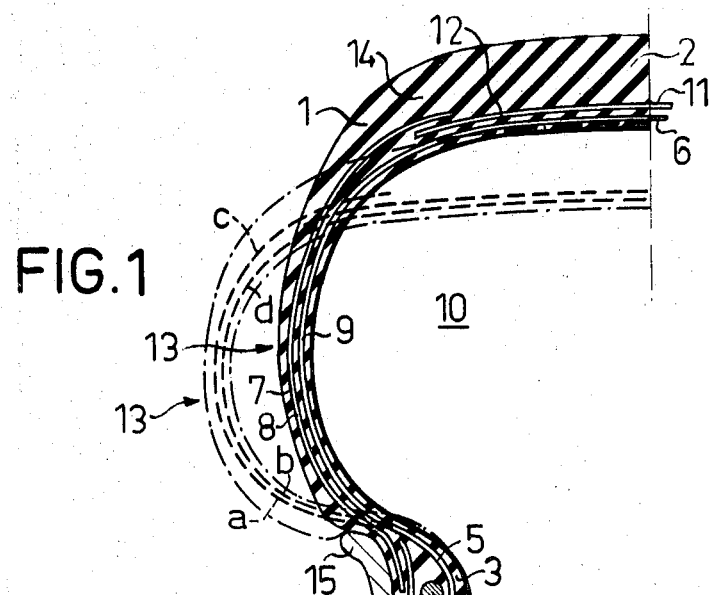
FIG. 1 is a radial partial section through a pneumatic tire according to the invention mounted on a rim, and shows in full line the contour of the tire when not subjected to an inward spring by contact with the ground surface, and furthermore shows in dot-dash lines the contour of the tire when subjected to an inward spring by contact with the ground surface.

The tire according to the present invention is characterized primarily in that the strength members of that layer which faces the inner or hollow tire chamber extend in that area which is adjacent the tire beads at a right or practically at a right angle with regard to the tire circumferential direction while the strength members of the same layer in that area of the tire sidewall which is adjacent the tire shoulders, are inclined with regard to the tire circumferential direction. The strength members of that layer which faces the outer surface of the tire are in that area of the tire sidewall which is adjacent to the tire beads inclined to the tire circumferential direction, and in that area of the tire sidewalls which is adjacent said tire shoulders, extend at a right angle or practically a right angle with regard to the tire circumferential direction.

With a tire reinforcing insert designed in this way, the inclined strength members will, when the tire is subjected to an inward spring by contact with the ground surface, move into the pressure zones, and the strength members or sections of strength members which extend at right angle to the tire circumferential direction will move into the pulling zones of the tire sidewall section.

Advantageously, the strength members of each layer which in each layer are substantially parallel to each other, are so arranged that the area where the strength member sections extending at substantially right angle with regard to the tire circumferential direction, merge with the strength members sections inclined to the tire circumferential direction, is located approximately at half the height of the tire sidewall. It is here that a so-to-speak neutral zone is created when the tire sidewall bulges outwardly in view of a contact to the tire with the ground surface.

The strength members may with a gradual change of the angle of the strength members pass into the above-mentioned merging zones, i.e. into the shoulder position and bead portion in order to avoid sharp disadvantageous bends within the tire sidewall. These angular changes may with regard to the radial direction amount to approximately from 5° to 30°. Preferably, the inclined sections of the strength members will within the areas of their greatest angular deviation from the radial direction form angles with said radial direction of magnitude of from approximately 20° to 25°.

Referring now to the drawing in detail the tire body 1 consisting primarily of rubber material, is provided with a tread strip 2, tire beads 3 and bead cores 4 therein and is reinforced by reinforcing inserts of rubberized cord fabric.

A cord fabric layer 5 has strength members 6 which are wound around the beads cores 4 and thus are anchored in the tire beads 3 while in an uninterrupted manner extending from one tire bead to the other tire bead. A further cord fabric layer 7 with strength members 8 extends substantially merely through the sidewalls 9. The strength members 8 are located laterally outwardly, in other words, have their outer face adjacent the outer face of the tire, whereas the strength members 6 are adjacent to the inner hollow chamber 10 of the tire. The strength members 8 which end at the marginal areas of the tread strip 2 slightly overlap an annular cord fabric layer 11 which extends substantially over the width of the tread strip and the strength members of which are designated with the reference numeral 12. According to FIG. 2 the strength members 6 extends from the beads 3 up to approximately half the height 13 of the tire sidewall 9 at a right angle to the tire circumferential direction. From there the strength member 6 extend approximately to the tire shoulder 14 at an angle of approximately 20° to the transverse direction of the tire. The strength member 6 will over the width of the cord fabric layer 11, i.e., over the width of the tread strip 2, describe with the tire circumferential direction an angle of approximately from 20° to 50°. The strength members 12 of the cord fabric layer 11, however, extend at an angle with regard to the tire circumferential direction but in an opposite inclined direction with regard to the directly adjacent sections of the strength members 6, so that between the two tire shoulders 14 there is formed a cross-connection which is laterally stable and pull resistant in the tire circumferential direction.

The strength members 8 of the fabric layer 7 together with the tire transverse direction extend in the sections from the tire beads to half the height 13 of the tire at an angle approximately 20°. The adjacent sections of the strength member 8 toward the tire shoulder 14, however, extend at a right angle with regard to the tire circumferential direction.

Figure 2:
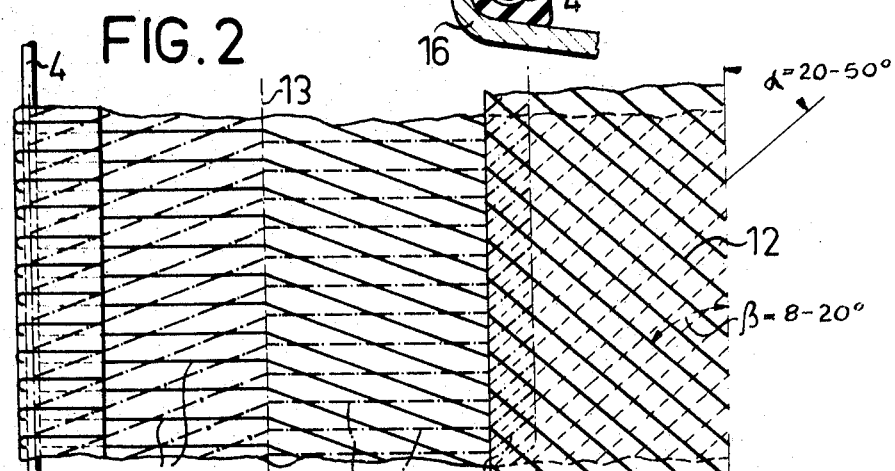
FIG. 2 shows the arrangement of the strength members in one tire half, for purposes of better illustration, said strength members all being shown in one drawing plane.

Thus, in an overall picture, there are obtained two cross-connection sections in the sidewalls 9, as indicated in FIG. 2.

When the nondeformed tire which is subjected only to the inner pressure, practically only bending stresses are introduced into the strength members 6 and 8 of the tire sidewalls 9. If, however, the tire body is depressed or pressed inwardly at the ground contacting area, and if under these circumstances the tire sidewalls 9 bulge outwardly, a pressure stress occurs at *a* for the sections of the strength members 8, whereas in the adjacent sections *b* near to and above the outer rim portion 15 of the rim 16 increased pulling stresses are introduced into the strength members 6. In the area between the tire shoulders 14 and half the tire height 13, however, inverse conditions are encountered. Here the sections of the strength members 8 will at *c* be subjected to increased pull stresses, whereas the adjacent sections of the strength members 6 are at *d* subjected to additional pressure stresses.

From a comparison between FIGS. 1 and 2, it will be seen that those sections of the strength members which when the tire is pressed inwardly by contact with the ground surface are subjected inwardly by contact with the ground surface are subjected to a superimposed pressure stress (see areas *d* and *a* extend at an incline to the tire transverse section, whereas within the areas *b* and *c* in which increased pulling stresses are induced, the sections of the strength members extend at a right angle to the tire circumferential direction and thus are favorably subjected to stresses. The strength members 6 and 8 in the tire sidewalls 9 are thus under consideration of the stresses occuring during the bulging of the tire sidewalls, displaced in such a way that they are subjected to favorable stresses.

It may be mentioned that the strength members 8 within the overlapping area in the tire shoulders 14 are angled off or are bent off at 17 and that the ends of the strength members here located extend in the direction of the immediately adjacent strength members 6, which means they extend at an incline with regard to the tire circumferential direction.

Figure 3:
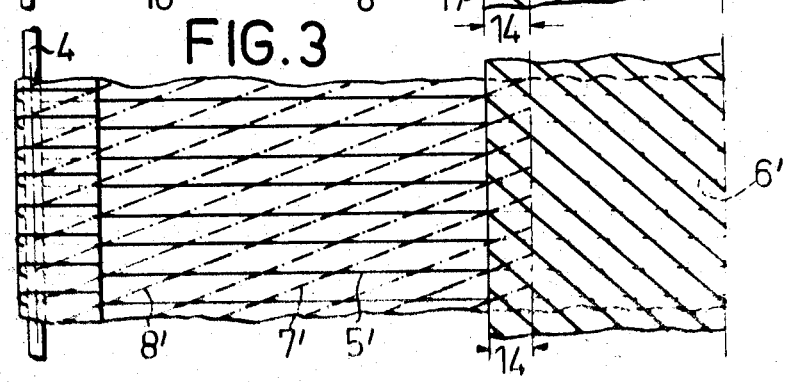
FIG. 3 shows the arrangement of the strength members of substantially hollow cylindrical raw tires produced according to the flat band method, which eventually results in the tire according to FIG. 1.

FIG. 3 illustrates the strengthening of the tread strip according to FIG. 1, and more specifically, when producing the raw tire on a substantially hollow cylindrical tire building drum. The layer 5' in this connection comprises strength members 6' extending at a right angle with regard to the circumferential direction of the raw tire. The said strength members 6' are stretched out, i.e. extend in rectilinear direction. The strength members 8' which form the layer 7' likewise extend in stretched-cut condition and, more specifically, at an incline with regard to the strength members 6'.

When the thus composed raw tire is curved, the course of the strength member is changed, and with the finishing vulcanized curved tire, the strength members of the tire reinforcement occupy the position shown in FIG. 2.

As will be seen in FIG. 1, the strength members 6 and 8 are arranged in two layers. If a still stronger reinforcement of the tire body is required, also superimposed strength members 6 and 8, respectively, arranged in two layers may be employed. However, in such an instance care is to be taken that the strength members 6 will face the hollow tire chamber 10, on one hand, and the strength members 8 facing the outer surface of the tire, on the other hand, are all parallel to each other so that also in this instance, all strength members of the outer surfaces and all strength members 6 of the inner surface of the tire are adjacent to each other.

It is, of course, to be understood, that the present invention is not limited to the particular arrangement illustrated in the drawings, but also comprises modifications thereof as are within the scope of the disclosure.

I claim:

1. A pneumatic vehicle tire having a tread strip with shoulders and having sidewalls with beads, which includes: first and second layer means of strength members one being located inwardly of the other in the sidewalls of the tire and the strength members of one layer means crossing the strength members of the other layer means, said first layer means comprising first strength member portions extending from the respective adjacent bead of each of said sidewalls over about half the height of the tire sidewall as measured from the respective adjacent bead, said first strength member portions extending at least nearly at a right angle with regard to the tire circumferential portion, said first layer means also comprising second strength member portions forming a continuation of said first strength member portions and continuing toward the respective adjacent shoulder portion while extending at an inclination with regard to the tire circumferential direction, said second layer means comprising third strength member portions extending from the respective adjacent bead of each sidewall over about half the height of the tire sidewall as measured from the respective adjacent bead, said third strength member portions extending at an incline with regard to the tire circumferential direction, and fourth strength member portions forming the continuation of said third strength member portions and continuing from the latter toward the respective adjacent tire shoulder, said fourth strength member portions extending at least nearly at a right angle with regard to the tire circumferential portion.

2. A tire according to claim 1 in which the strength members of said first layer means extend in an uninterrupted manner from bead to bead, and in which the strength members of said second layer means extend merely from the respective adjacent tire bead to approximately the respective adjacent tire shoulder.

3. A tire according to claim 2, in which the strength members extending from bead to bead have those thread portions thereof which are located between the tire shoulder extending at an incline with regard to the tire circumferential direction, and which comprises additional strength members extending approximately from shoulder to shoulder only of the tire and crossing those strength member portions of said first layer means which are located between said tire shoulders.

4. A vehicle tire according to claim 3, in which those strength member portions of said first layer means which are located between the tire shoulder extend in an inclined direction opposite to the inclined direction of said second strength member portions.

5. A tire according to claim 3, in which which said fourth strength member portions include a section angled off in overlapping relationship to the respective adjacent marginal portions of said additional strength members and extend at an incline opposite to the incline of said additional strength member.

6. A tire according to claim 1, in which the first and second strength member portions meet each other at about half the height of the said tire sidewalls, and in which also the third and fourth strength member portions meet at about half the height of said tire sidewalls.

7. A tire according to claim 1, in which the second and third strength member portions define an angle of from 5° to 30° with regard to the transverse direction of the tire.

8. A tire according to claim 1, in which the angles defined by said second and third strength member portions with the circumferential direction of the tire increase from the area where the first and second strength member portions meet toward the respective adjacent shoulder and from the area where the third and fourth strength member portions meet toward the respective adjacent shoulder.